United States Patent
Mahieu et al.

(10) Patent No.: US 12,105,190 B2
(45) Date of Patent: Oct. 1, 2024

(54) MONITORING SYSTEM FOR AN AGRICULTURAL HARVESTER AND AGRICULTURAL HARVESTER

(71) Applicant: CNH Industrial America LLC, New Holland, PA (US)

(72) Inventors: Thomas Mahieu, Ypres (BE); Bart M. A. Missotten, Herent (BE); Bart Lenaerts, Zutendaal (BE); Jean-Edouard Blanquart, Lorgies (FR)

(73) Assignee: CNH Industrial America LLC, Holland, PA (US)

(*) Notice: Subject to any disclaimer, the term of this patent is extended or adjusted under 35 U.S.C. 154(b) by 1096 days.

(21) Appl. No.: 16/491,815

(22) PCT Filed: Mar. 9, 2018

(86) PCT No.: PCT/EP2018/055880
§ 371 (c)(1),
(2) Date: Sep. 6, 2019

(87) PCT Pub. No.: WO2018/162699
PCT Pub. Date: Sep. 13, 2018

(65) Prior Publication Data
US 2021/0127573 A1 May 6, 2021

(30) Foreign Application Priority Data
Mar. 9, 2017 (BE) .................................. 2017/5147

(51) Int. Cl.
*A01D 41/127* (2006.01)
*A01D 41/12* (2006.01)
(Continued)

(52) U.S. Cl.
CPC .......... *G01S 13/88* (2013.01); *A01D 41/1243* (2013.01); *A01D 41/1271* (2013.01); *G01S 13/584* (2013.01)

(58) Field of Classification Search
CPC .............. A01D 41/127; A01D 41/1243; G01S 13/584; G01S 13/88
See application file for complete search history.

(56) References Cited

U.S. PATENT DOCUMENTS

2005/0194473 A1  9/2005  Pearson et al.
2015/0264864 A1* 9/2015  Branch .............. A01D 41/1243
                                                      701/50
(Continued)

FOREIGN PATENT DOCUMENTS

DE   102014014049 A1 * 3/2016 ......... A01D 41/1243
WO   2015177190 A1   11/2015

OTHER PUBLICATIONS

PCT International Search Report and Written Opinion for PCT application PCT/EP2018/055880, mailed Jun. 11, 2018 (15 pages).

*Primary Examiner* — Timothy A Brainard
*Assistant Examiner* — Ismaaeel A. Siddiquee
(74) *Attorney, Agent, or Firm* — Rickard K. DeMille

(57) ABSTRACT

A monitoring system for a combine harvester having a header for harvesting a crop and a residue spreading system for spreading a crop residue. The monitoring system includes a sensing system configured to provide one or more measurement waves that intersect a flow of crop residue discharged by the spreading system and receive a plurality of response waves reflected from the crop residue. The system further includes a processing unit configured to receive a response signal of the sensing system; process the response signal; and determine, based on the response signal, a density and velocity distribution of the crop residue across a two-dimensional measurement area. The response (Continued)

signal is representative of the plurality of response waves reflected from the crop residue. The measurement area is at an end of a trajectory of the crop residue towards a deposit area.

18 Claims, 11 Drawing Sheets

(51) Int. Cl.
*G01S 13/58* (2006.01)
*G01S 13/88* (2006.01)

(56) References Cited

U.S. PATENT DOCUMENTS

| | | | |
|---|---|---|---|
| 2016/0195505 A1* | 7/2016 | Pickett | A01B 79/005 |
| | | | 702/2 |
| 2017/0016870 A1* | 1/2017 | McPeek | A01D 41/127 |
| 2018/0084718 A1* | 3/2018 | Baumgarten | A01D 41/1243 |

* cited by examiner

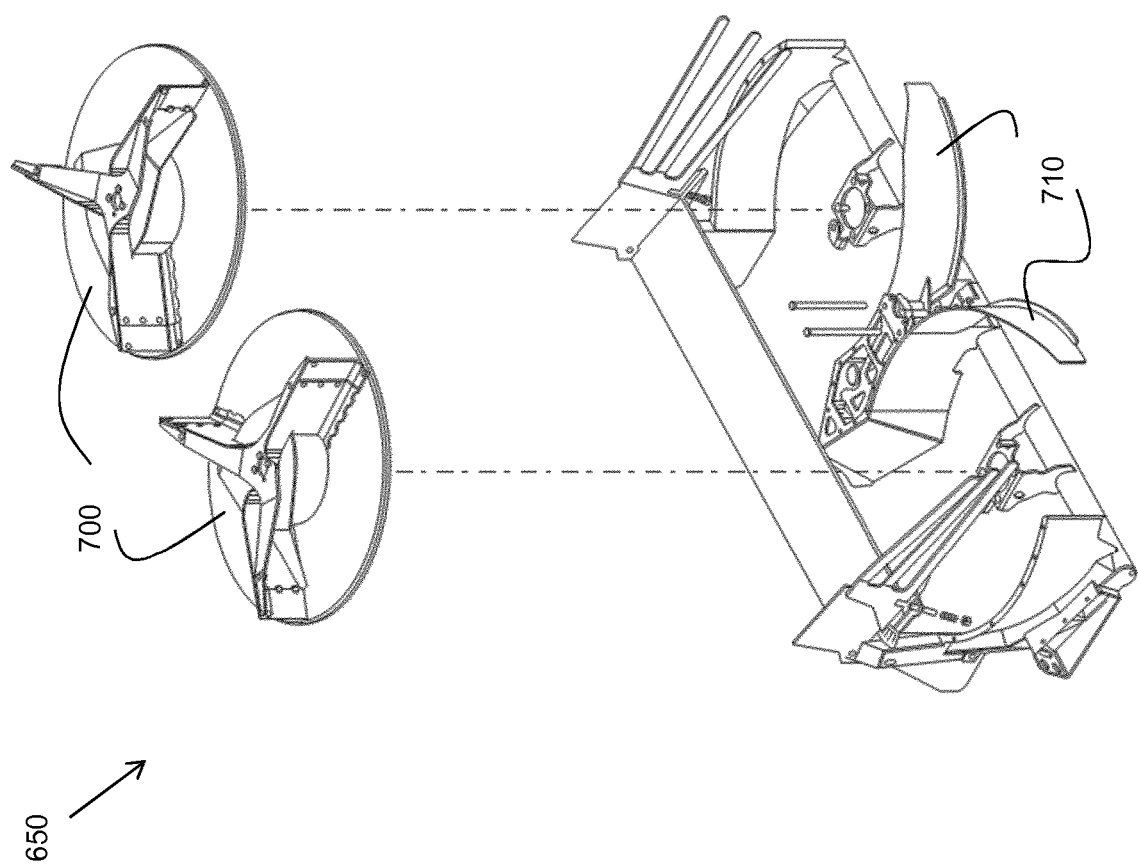

MONITORING SYSTEM FOR AN AGRICULTURAL HARVESTER AND AGRICULTURAL HARVESTER

FIELD OF THE INVENTION

The invention relates to the field of agricultural harvesters such as combines which include a threshing assembly for separating the various components of a harvested crop, e.g. grain and straw.

In particular, the invention relates to a monitoring system for assessing the quality of the distribution of chopped straw onto a field.

BACKGROUND OF THE INVENTION

An agricultural harvester, also referred to as a combine or combine harvester because it typically combines multiple harvesting functions, typically includes a header for removing a crop from a field and a so-called threshing tool for performing a threshing operation on the crop in order to separate the grain from the non-grain material such as straw and chaff. The non-grain material may also be referred to as the residue. This residue, i.e. the chaff and straw is typically left on the field. In general, the chaff is spread in the field over the width of the combine. With respect to the straw, typically two options exist.

In a first operating mode, referred to as "swath mode", the straw is outputted onto the field in a so-called swath, ready for a baler to pick it up.

In a second operating mode, referred to as "chopping mode", the straw is chopped and outputted on the field where it serves as fertilizer for the soil. The straw is therefore chopped fine to obtain an optimal rotting process such that it can be absorbed into the soil thereby setting free minerals for subsequent crops.

In order to obtain an effective fertilization of the soil it is important that the chopped straw, in general the crop residue, is sufficiently small and that the chopped straw is evenly, or uniformly distributed over the field. As such, the crop residue should be distributed over a width substantially corresponding to a width of the header of the harvester that cuts the crop. In order to distribute or spread the crop residue, e.g. chopped straw, agricultural harvesters are typically equipped with a spreader tool that is mounted at the back of the harvester. The spreading tool is configured to receive a flow of chopped straw and deflect it to both the right hand side and the left hand side of the harvester. It is known that the way the residue or chopped crop is spread is affected by different parameters, e.g. including the elevation of the field, the wind direction and magnitude, the density of the chopped straw, etc.

In order to improve the distribution of the residue or chopped straw, monitoring systems have been suggested. Examples of such monitoring systems include the use of a camera to picture the swath of chopped straw leaving the harvester, or the use of wind vanes and/or wind velocity sensors. In another example, the use of a pair of ultrasonic sensors is suggested, the pair of ultrasonic sensors that are directed to the respective streams of chopped straw towards the left hand side and the right hand side of the harvester. These sensors arrangements are prone to disturbances by environmental factors, such as dust blocking the signals or variations in wind speed and harvester inclination.

DE 10 2014 014 049 A1 proposes to provide an array of radar sensors around the spreader disks or at the outlet of the spreading tool. These sensors are remote from the final deposit area of the crop residue and require a modelling of the influences of the environmental factors to reconstitute the final distribution of the residue on the soil.

None of these arrangements enables a robust assessment the distribution of the chopped straw over the entire width of the header of the harvester. Therefore, there is a need for an improved monitoring system for assessing the distribution or chopped straw as outputted onto a field.

SUMMARY OF THE INVENTION

It would be desirable to provide an agricultural harvester which enables an assessment of the distribution of chopped straw or crop residue over the width of a harvester's header in a more accurate manner. Therefore, the present invention provides for a monitoring system for a combine harvester having a header with a header width for harvesting a crop and a residue spreading system for spreading a crop residue, the monitoring system comprising:

a sensing system configured to:
provide one or more measurement waves intersecting a flow of crop residue discharged by the spreading system, the one or more measurement waves determining a two-dimensional measurement area;
receive a plurality of response waves reflected from the measurement area;
a processing unit comprising an input terminal configured to receive a response signal of the sensing system, the response signal representative of the plurality of response waves reflected from the measurement area; the processing unit being configured to determine, based on the response signal, a density and velocity distribution of the crop residue across the two-dimensional measurement area,
wherein the measurement area is at the end of the trajectory of the crop residue from the spreading system to a deposit area.

Typically, a combine harvester comprises a chopping assembly for chopping a residue of the harvested crop, e.g. straw, to an appropriate size to be spread on the field and a spreading assembly, spreading system or spreader, to provide in an appropriate distribution of the crop residue that was chopped over the field. Typically, such a spreading assembly may be configured to separate a flow of crop residue as received from the chopping assembly into a first flow that is outputted to a left hand side of the harvester and a second flow that is outputted on a right hand side of the harvester. In order to realize an effective fertilization of the field, the distribution of the crop residue should be as uniform as possible over the entire field. The present invention provides, in an embodiment, in a monitoring system for a combine harvester which enables to forecast a distribution of spreading of crop residue as outputted by a spreader of the harvester.

In accordance with an embodiment of the present invention, the monitoring system comprises a sensing system, e.g. comprising one or more sensors, that is configured to provide a plurality of measurement waves to an area of interest. In particular, in accordance with the present invention, the sensing system is configured to direct the measurement wave or waves towards the flow of crop residue that is emitted by the spreading system, such that the measurement wave or waves intersect with the flow of crop residue along a two-dimensional area, referred to as the measurement area. In accordance with a preferred embodiment of the present invention, the measurement area substantially covers or exceeds a spreading area of the flow of crop residue, whereby the spreading area corresponds to the area over which the crop residue is spread. In an embodiment, the spreading area may comprise the area covered by a trajectory of the crop residue from an outlet of the spreading system to a deposit area, i.e. the area on the soil where the flow or crop residue lands. The sensing system is further configured to receive, due to the interaction of the flow of crop residue with the measurement wave or waves, reflected measurement waves, also referred to as response waves, from the two-dimensional area. In an embodiment, the measurement waves as emitted by the sensing system are arranged in a substantially horizontal plane, i.e. at a predetermined distance above the soil. In such an arrangement, the flow of crop residue is thus monitored before it lands on the soil. In accordance with an embodiment of the present invention, the monitoring system is configured to determine, based on a processing of the received reflected measurement waves, where the flow of crop residue will be deposited, i.e. where the crop residue will land.

In order to obtain this information, the monitoring system comprises a processing unit that is configured to determine, based on the received reflected measurement waves, the location and velocity of the crop residue detected in the two-dimensional measurement area where the measurement waves intersect with the flow of crop residue. In particular, in accordance with the present invention, the processing unit of the monitoring system is configured to determine a density and velocity distribution of the flow or crop residue.

In an embodiment, such a density and velocity distribution may be made available for reviewing by an operator of the combine harvester. The density and velocity distribution may e.g. be displayed on a display in the cabin of the combine harvester. In such an embodiment, the operator may e.g. use the density and velocity distribution as displayed as a visual feedback of the manner in which the crop residue is spread across the spreading area. This visual feedback may e.g. be used to adjust an operating parameter of the spreading system. In case the density and velocity distribution as displayed would correspond to a desired density and velocity distribution, the operator may e.g., in an embodiment of the present invention, provide an input signal to the processing unit of the monitoring system, the input signal being indicative that the density and velocity distribution substantially corresponds to a desired density and velocity distribution.

In such embodiment, the processing unit may be configured to, upon receipt of such an input signal:
receive a subsequent response signal of the sensing system, the subsequent response signal representative of a plurality of subsequent response waves reflected from the measurement area;
determine, based on the response signal, a subsequent density and velocity distribution of the crop residue across the two-dimensional measurement area, and
determine, based on a comparison of the subsequent density and velocity distribution and the desired density and velocity distribution, a control signal for the spreading system, in order to substantially maintain the desired density and velocity distribution.

In such an embodiment, the processing unit may thus be configured to autonomously control the spreading system, once a desired distribution of the flow of crop residue is reached, thereby controlling the spreading system in such manner that the desired distribution is substantially maintained.

In an embodiment, the processing unit is further configured to determine, based on the determined crop residue distribution and velocity, a distribution of the crop residue as it ends up on the soil, i.e. a distribution of the crop residue across the deposit area. As such, in the present invention, the distribution of the crop residue as it ends up on the soil is forecasted, i.e. predicted based on a measured distribution of the crop residue, prior to it being deposited on the soil.

Typically, it is desired that the crop residue is spread evenly over an area having a width corresponding to the width of the header of the harvester. In accordance with the present invention, the area onto which a crop residue is to be deposited is referred to as the deposit area.

In order to determine the distribution of the crop residue over the deposit area, the processing unit of the monitoring system may be configured to determine:
a trajectory of the crop residue towards the deposit area on the soil based on the density and velocity distribution; and
a distribution of the crop residue over the deposit area.

In an embodiment, the processing unit further comprises an output terminal configured to output a distribution signal representative of the distribution of the crop residue over the deposit area. The processing unit may further, in an embodiment, assess the uniformity of the distribution of the crop residue along the header width.

In an embodiment, the processing unit may use a ballistic model to determine the trajectory of the crop residue towards the deposit area. Such a ballistic model to determine the trajectory of the crop residue may make use of one or more of the following parameters:
average crop residue length,
humidity of the crop residue and/or the air,
wind velocity,
combine velocity,
air resistance,
flow rate of the spreading system,
etc.

In an embodiment, the model parameters may be determined based on measurement data obtained from one or more sensors on the combine harvester. Alternatively, or in addition, appropriate values for the parameters may also be provided by an operator, e.g. via a user interface connected to the processing unit.

In an embodiment, the distribution of the crop residue on the soil as forecasted may be compared to a desired distribution. When the distribution over the deposit area is determined, i.e. forecasted, the uniformity of the distribution over the deposit area may be determined. An assessment of the uniformity may be obtained in various manners. As an example, the deposit area may be considered to consist of a plurality of sub-areas and the amount of crop residue in each of these sub-areas may be calculated, using the determined, forecasted, distribution. When the amounts of crop residue in each of the sub-areas is determined, one may e.g. determine a variance of said amounts, the variance being an indication of the uniformity of the distribution.

Alternatively, a comparison between the largest amount and the smallest amount may also be used as an indication of the uniformity.

In an embodiment of the present invention, the processing system of the monitoring system may further be configured to determine, based on the forecasted distribution, a control signal for controlling a spreader system of the harvester.

In an embodiment, the sensing system may be configured to sense the distribution of the crop residue in multiple cross-sectional areas of the flow of crop residue. In such an arrangement, the sensing system may e.g. be configured to emit a one or more measurement waves in a first plane intersecting the flow of crop residue, thereby defining a first two-dimensional measurement area and to emit a plurality of measurement waves in a second plane intersecting the flow of crop residue, thereby defining a second two-dimensional measurement plane. In such embodiment, the first and second measurement planes may e.g. be parallel to each other.

In an embodiment, the one or more measurement waves as provided by the sensing system determine a three-dimensional measurement volume intersecting the flow of crop residue discharged by the spreading system. In such an embodiment, the processing unit of the monitoring system may be configured to determine the density and velocity distribution in the three-dimensional measurement volume. Such an approach may enable to more accurately determine the trajectories of the crop residue and, consequently, a more accurate distribution of the crop residue on the deposit area.

In accordance with the present invention, the measurement waves as provided by the sensing system may e.g. be acoustic pulses, ultrasonic pulses or electromagnetic pulses or waves. In an embodiment, the sensing system comprises a plurality of sensors, each sensor e.g. comprising a emitter for emitting a measurement wave and a receiver for receiving one or more reflected measurements waves. Examples of such sensors capable or emitting measurement waves and receiving reflected measurement waves include ultrasonic transducers and radar antennas.

In an embodiment, the sensors as applied in the monitoring system according to the present invention may include a radar to emit radar waves as the measurement waves and a plurality of antennas to receive the reflected waves. Examples of such radars may include CW-radars (Continuous Waves) or FMCW-radars (Frequency Modulated Continuous Waves). The latter type of radar provides the advantage that both the location and velocity of an object may be determined simultaneously.

In an embodiment, the sensing system, e.g. the radar system or ultrasonic system, is configured to apply beamforming in order to electronically scan the measurement area.

In an embodiment, the sensors of the monitoring system are configured to sense the two-dimensional measurement area with an angular resolution. In an embodiment, the sensing system comprises two or more radars, each covering a measurement area spanning a predetermined angle, e.g. 45 or 60 degrees.

In an embodiment, one or more of the plurality of sensors are configured to rotate or swivel during operation. Alternatively, or in addition, a revolving deflector may be applied in the path of the measurement wave or waves of the sensors, thereby obtaining a fan-shaped scan of the measurement area. In such an arrangement, a single sensor may cover or monitor multiple sub areas of the area of interest by emitting, while rotating or swiveling, multiple measurement waves. In such an embodiment, the monitoring system may still cover or monitor the entire area of interest with a limited number of sensors.

As discussed above, the monitoring system according to the present invention comprises a processing unit. Such a processing unit may e.g. comprise a microprocessor or the like for performing mathematical operations on signals that are received.

In accordance with the present invention, the processing unit of the monitoring system comprises an input terminal configured to receive a response signal of the plurality of sensors, the response signal representative of the plurality of response waves reflected from the area of interest. The input terminal may be a single input terminal or a multichannel input terminal. In the latter case, each sensor may be connected to a different channel of the input terminal. The response signal as received at the input terminal may e.g. be an analogue voltage signal, e.g. a voltage signal outputted by the sensor in response to the receipt of a response wave.

In an embodiment, the monitoring system is mounted to a combine harvester according to the present invention. In general, such a harvester comprises a header for harvesting a crop of a field, a threshing and chopping system for separating a crop residue from the harvested crop, a spreader assembly for spreading the crop residue onto the field and a monitoring system according to the invention. As an example, the harvester may be configured to harvest grain whereby the threshing and chopping system is configured to separate the grain and chop the remaining straw, the chopped straw thus being considered the crop residue. The use of the monitoring system according to the present invention on such a combine harvester enables to monitor the distribution of the crop residue, as distributed by the spreader assembly, along the width of the header of the harvester.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 9 schematically depicts various components of the spreader assembly as shown in FIG. 8.

DETAILED DESCRIPTION OF EMBODIMENTS

Figure 1:
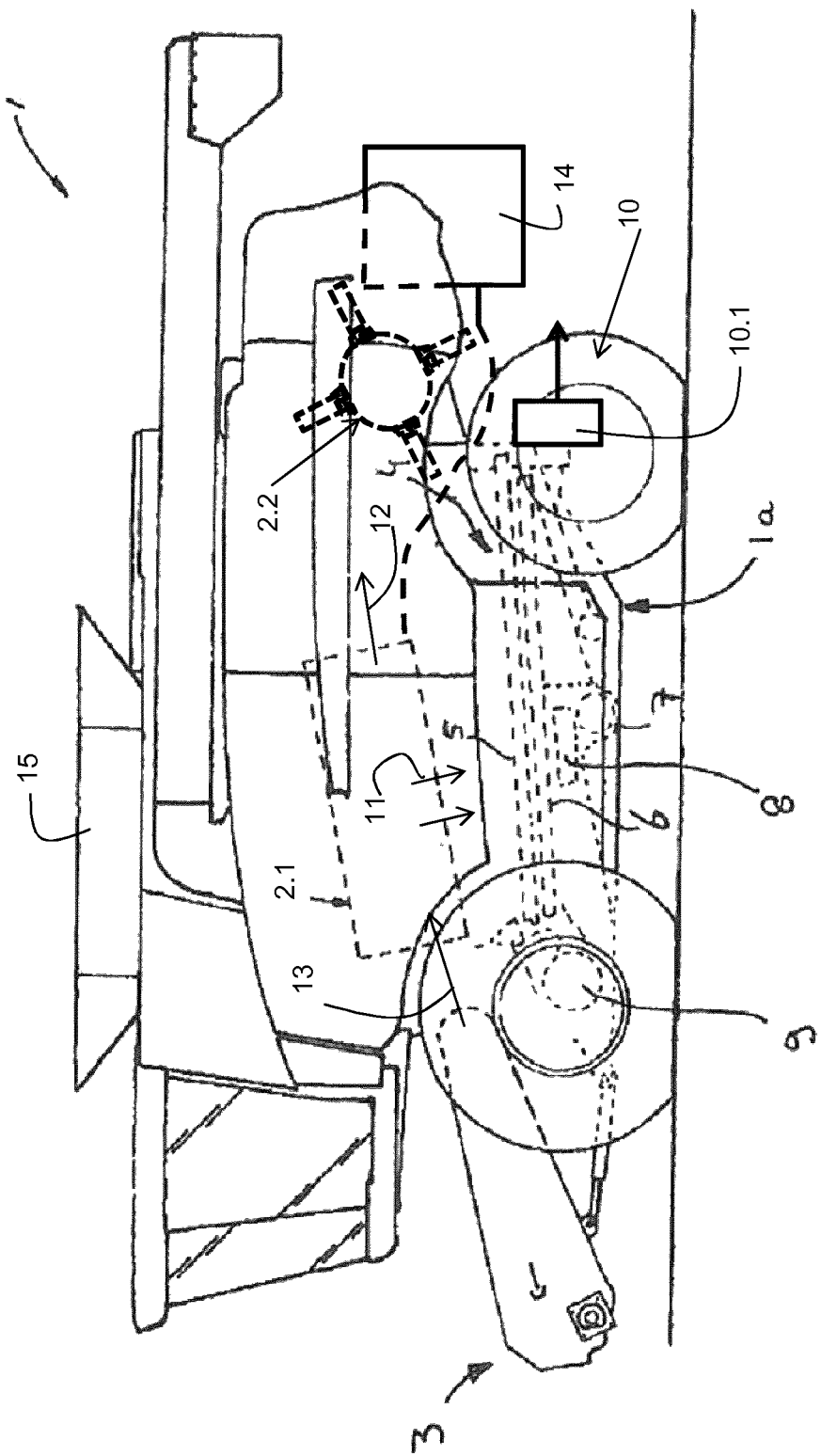
FIG. 1 depicts a monitoring system mounted to a combine harvester according to an embodiment of the present invention.

FIG. 1 depicts, in a cross-sectional view, a combine harvester 1 including a monitoring system 10 according to an embodiment of the present invention. The agricultural harvester 1 can e.g. be configured to harvest grain as a crop, whereby chopped straw can be considered a crop residue. The harvester 1 as schematically shown in FIG. 1 comprises a feeder 3 to which a header (not shown) for harvesting a crop may be connected, a threshing and chopping system 2 for separating the harvested crop (the flow of harvested crop being indicated by the arrow 13) into crop that is e.g. gathered in an onboard tank 15 and crop residue, e.g. chopped straw. In the embodiment as shown, the threshing and chopping system comprises a threshing assembly 2.1 configured to separate the cut crop into a first stream or flow (indicated by the arrow 11), substantially composed of grain and chaff, and a second stream or flow (indicated by the arrow 12), substantially composed of straw. The second stream or flow 12 is subsequently processed by a chopping assembly 2.2 of the threshing and chopping system 2, thereby generating a flow of crop residue, e.g. chopped straw, that is distributed onto the field by a spreader assembly 14. In the harvester according to the present invention, this crop residue is monitored by a monitoring system 10 which is configured to provide a distribution signal representative of the distribution of the crop residue over a deposit area substantially spanning the width of the header 3 of the harvester 1. The width of the header 3 being understood as the length of the header 3 in a direction perpendicular to the cross-sectional view of FIG. 1. In order to realize this, the monitoring system 10 according to the present invention comprises a sensing system, e.g. comprising a plurality of sensors such as ultrasonic or electromagnetic sensors 10.1, configured to provide a plurality of measurement waves, the measurement waves configured to intersect with the flow of crop residue that is outputted by a spreading system or spreading assembly 14 of the combine harvester 1. In accordance with the present invention, the intersection of the plurality of measurement waves and the flow of crop residue result in a two-dimensional measurement area from which response waves, i.e. reflected measurement waves may be received, whereby the two-dimensional measurement area substantially covers or exceeds the area over which the crop residue is spread, i.e. the spreading area. Based on the reflected measurement waves, a processing unit of the monitoring system according to the present invention may determine a distribution of the crop residue over a deposit area, i.e. the area onto which the spreader assembly 14 of the combine harvester 1 spreads or should spread the crop residue.

In case the crop residue (e.g. chopped straw) is spread onto the field, the purpose is to realize a fertilization of the field. The chopped crop is spread over the field where it decomposes such that it can be absorbed into the soil thereby setting free minerals for subsequent crops.

In order to obtain an optimal fertilization, a uniform distribution of the crop residue over the field is preferred. In order to assess the manner in which the crop residue is spread over the area of interest, the sensing system as applied in a monitoring system according to the present invention is further configured to receive a plurality of response waves reflected from the measurement area, in response to the plurality of measurement waves that were provided to the measurement area. These response waves, or a signal representative thereof are provided to an input terminal of a processing unit of the monitoring system 10 and processed, as will be explained in more detail below.

Further, as schematically shown in FIG. 1, the first stream 11 of harvested crop may e.g. be conveyed via a grain pan to a cleaning mechanism 4, e.g. including one or more sieves 5, 6, driven by a drive assembly 8 and a cleaning fan 9. The fine material, e.g. grain, that is collected below the sieves is transported by means of an auger 7, e.g. to an elevator.

Figure 2:
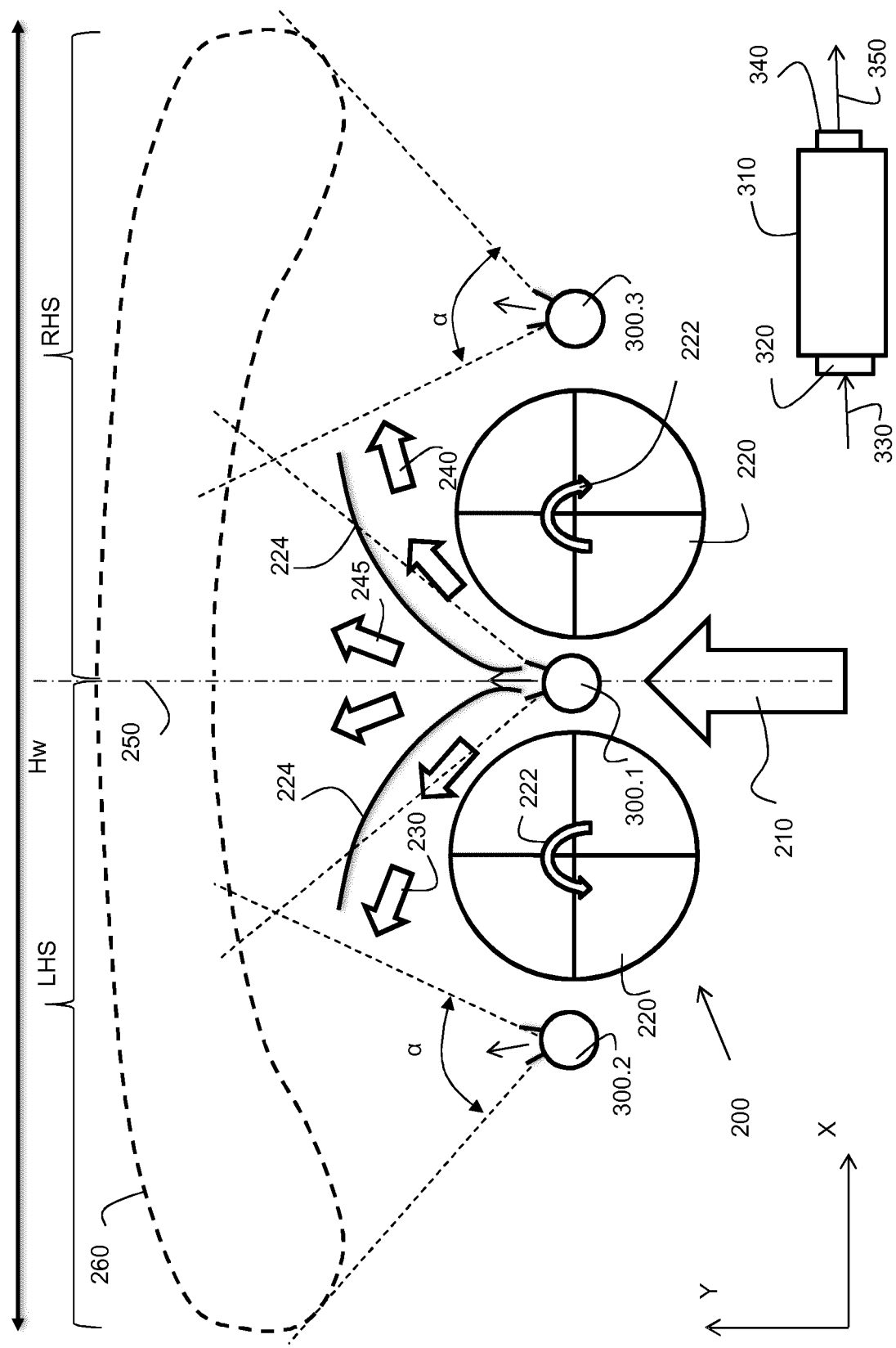
FIG. 2 schematically depicts a top view of a spreader assembly as can be applied in a combine harvester according to the present invention and a first embodiment of a monitoring system according to the present invention.

FIG. 2 schematically shows a top view of a spreader assembly as can be applied in a combine harvester according to the present invention and an embodiment of a monitoring system according to the present invention. FIG. 2 schematically depicts a spreader assembly 200 (comparable to the spreader assembly 14 of FIG. 1) configured to receive a flow of crop residue 210, e.g. from a chopping assembly such as chopping assembly 2.2 as shown in FIG. 1, and spread the flow of crop residue. In the embodiment as shown, the spreader assembly 200 comprises two rotational elements 220, rotating in the indicated directions 222, to guide the flow 210, and two deflectors 224 configured to receive the flow of crop residue 210, deflect at least part of it and distribute the flow onto the left hand side LHS, resp. right hand side RHS as indicated by the arrows 230, resp. 240. The left hand side LHS area and right hand side RHS area are here defined relative to a longitudinal axis 250 of the harvester to which the spreader assembly 200 is mounted. By adjusting the position of the deflectors 224, the distribution of the crop residue on the resp. LHS and RHS can be adjusted. Note that by appropriate shaping and positioning of the deflectors 224, part of the flow of crop residue, indicated by the arrows 245, can be spread on the field behind the spreader assembly 200.

The objective of the spreading of the crop residue flow 210 is to arrive at a substantially uniform distribution over an area of interest 260, i.e. the area onto which the crop residue is to be spread or deposited. Typically, this deposit area 260 will have a width substantially spanning the width Hw of the header of the harvester (not shown) to which the spreading assembly 200 is mounted.

In order to assess the distribution of the crop residue over the area of interest 260, the present invention provides in a monitoring system. FIG. 2 schematically includes an embodiment of such a monitoring system, the monitoring system comprises a sensing system that comprises a plurality of sensors 300.1-300.3, e.g. radars or ultrasonic sensors.

In accordance with the present invention, the sensing system is configured to:
provide a plurality of measurement waves, the plurality of measurement waves being configured to intersect a flow of crop residue as outputted or discharged by the spreading system, thereby defining a two-dimensional measurement area, and
receive a plurality of response waves reflected from the measurement area.

In accordance with the present invention, the measurement area covers or exceeds the spreading area, i.e. the area covered by the flow of crop residue as emitted by the spreading system. As such, the spreading area may be considered the area covered by the flow of crop residue, when the flow is observed from above.

Referring to the sensing system comprising the sensors 300.1-300.3 of FIG. 2, each of the sensors of the sensing system is configured to emit one or more measurement waves towards the flow of crop residue 230, 240, 245, whereby the measurement waves are arranged to intersect with the flow of crop residue as outputted by the spreader assembly. In the arrangement as shown, the one or more measurement waves as outputted by each of the sensors span a scan angle α, thus defining an area, i.e. a segment of a circle, that is scanned. In an embodiment, the angle α defining the angle of the area that is scanned, may e.g. be 180°, 90°, 60° or 45°. Any part or portion of the flow of crop residue that crosses this segment, may give rise to a response wave or reflected measurement wave. As such, for each of the sensors 300.1-300.3, the intersection of the area covered by the measurement waves and the flow of crop residue, will result in a two-dimensional measurement area. Depending on the scan angle α, one or more sensors may be applied so as to substantially monitor the entire flow of crop emitted by the spreading system. In FIG. 2, the central portion of the residue flow is monitored by a centrally arranged sensor 300.1 and the left hand and right hand outer portions are monitored by left hand and right hand sensors 300.2 and 300.3, respectively. The information provided by the outer sensors is crucial for the assessment of the overall width of the deposit area 260.

In this respect, it should be pointed out that, in the present invention, the monitoring of the flow of crop residue takes place, at least partly, before the crop residue arrives on the soil. As an example, the sensors 300.1-300.3 may e.g. be configured to emit the one or more measurement waves in a horizontal plane, at a predetermined distance above the soil. In such an arrangement, the sensors may be mounted underneath the spreading assembly. In an embodiment, as illustrated below, the measurement area may be arranged at an angle, relative to the horizontal plane. In case the spreading system is arranged at an angle relative to the horizontal plane, the measurement area may e.g. be arranged at the same angle.

The plurality of sensors 300.1-300.3 are further configured to receive a plurality of response waves that are reflected from the measurement area.

In an embodiment, one or more radars are applied to emit the plurality of measurement waves towards the flow of crop residue, thereby generating a two-dimensional measurement area where the measurement waves intersect with the flow of crop residue.

More details on the use of radars is provided below.

In accordance with the present invention, the monitoring system further comprises a processing unit. The monitoring system as shown in FIG. 2 comprises a processing unit 310 having an input terminal 320 to receive a response signal 330 representative of the plurality of response waves reflected from the measurement area or areas. Such a processing unit 310 can be embodied as a processor, a microprocessor, a computer or the like and in general comprises a memory unit for storing data such as the response signal and a computational unit for processing the data received. The response signal 330 can e.g. be provided to the processing unit 310 by means of a wired connection between the sensors 300.1-300.3 and the processing unit 310 or by means of a wireless connection.

In an embodiment, the processing unit 310 may also be configured to control the plurality of sensors 300.1-300.3, in particular, the processing unit 310 may be configured to control at least one of a timing of the measurement pulses or waves, an amplitude of the measurement pulses or waves or a frequency or frequency content of the measurement pulses or waves.

In accordance with an embodiment of the present invention, the processing unit 310 is configured to process the response signal 330 and determine, based on the response signal, a density and velocity distribution of the flow of crop residue across the two-dimensional measurement area, i.e. the area covering or exceeding the spreading area.

In an embodiment of the present invention, the processing unit 310 may further be configured to determine, based on the density and velocity distribution of the flow of crop residue a trajectory of the crop residue towards a deposit area on the soil based on the density and velocity distribution; and a distribution of the crop residue over the deposit area (260);

This processing will be explained in more detail below.

In accordance with the present invention, the processing unit 310 may further comprising an output terminal 340 configured to output a distribution signal 350 representative of the density and velocity distribution of the flow of crop residue or the distribution of the flow of crop residue over the area of interest or both. Such a distribution signal may e.g. a one or two dimensional graph or image specifying the distribution, e.g. across the spreading area or as a function of the position along the header width Hw.

In an embodiment, the distribution signal is provided to a display unit that is mounted in a cabin of the harvester, in order to provide a visual feedback of the distribution of the crop residue to the operator of the harvester. Based on this feedback, the operator may then adjust, if needed, an operating parameter of the harvester, in particular of the spreader assembly of the harvester, to adjust the spreading of the crop residue, thereby adjusting the distribution of the crop residue over the deposit area 260.

In an embodiment, the processing unit 310 may be configured to determine a control signal for controlling an operating parameter of the spreader assembly, based on the distribution of the crop residue over the deposit area as determined. In such embodiment, the monitoring system may thus autonomously adjust and operation of the spreading assembly, based on the determined distribution. Note that, in such an arrangement, is may still be advantageous to provide the aforementioned visual feedback of the distribution, e.g. to a display in the cabin of the combine harvester.

Figure 3:
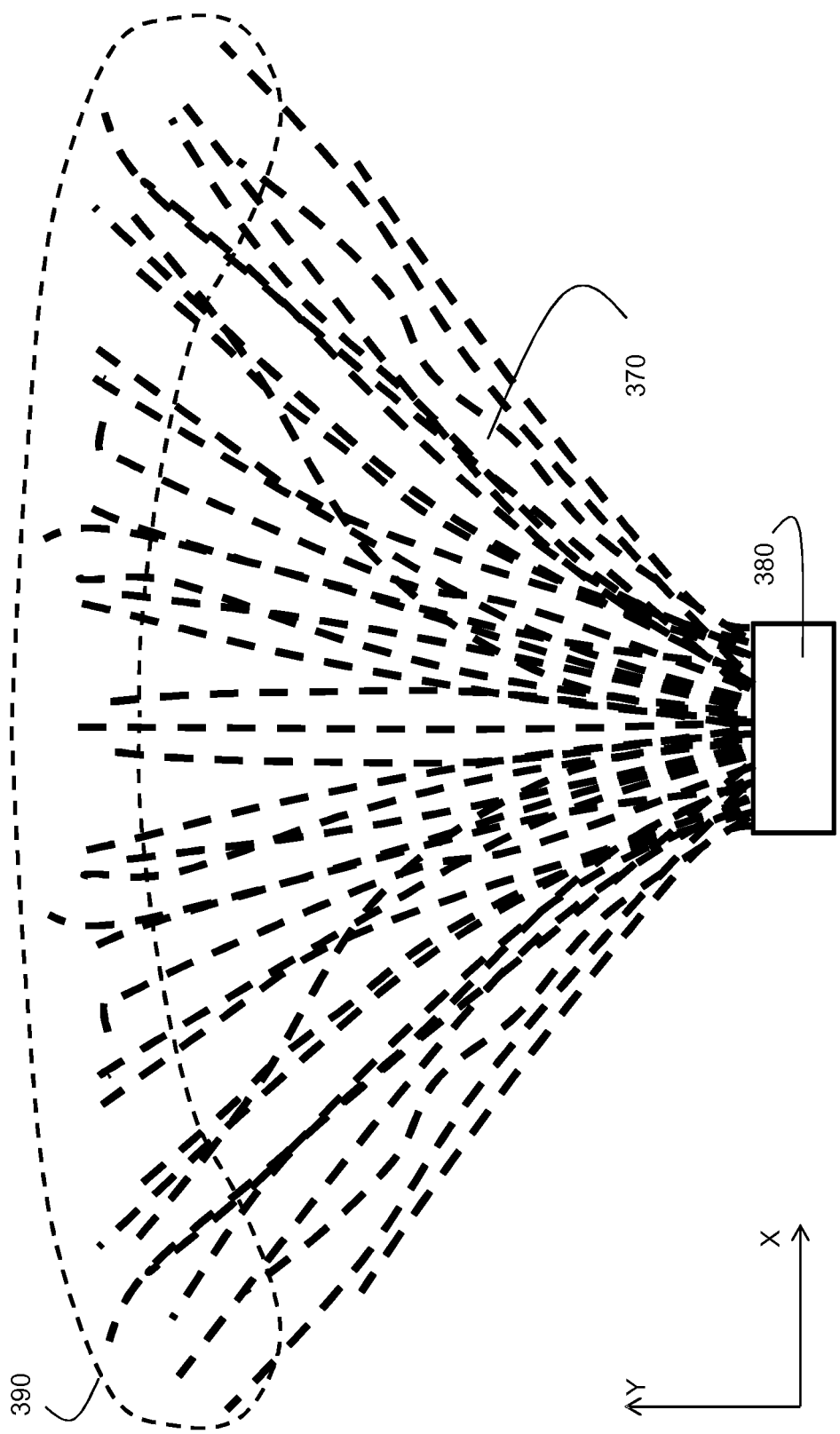
FIG. 3(a) schematically depicts a top view of a flow of crop residue as outputted by a spreading system.
FIG. 3(b) schematically depicts a cross-sectional view of a spreader assembly as can be applied in a combine harvester according to the present invention and a first sensing system of a monitoring system according to the present invention.
Figure 3:
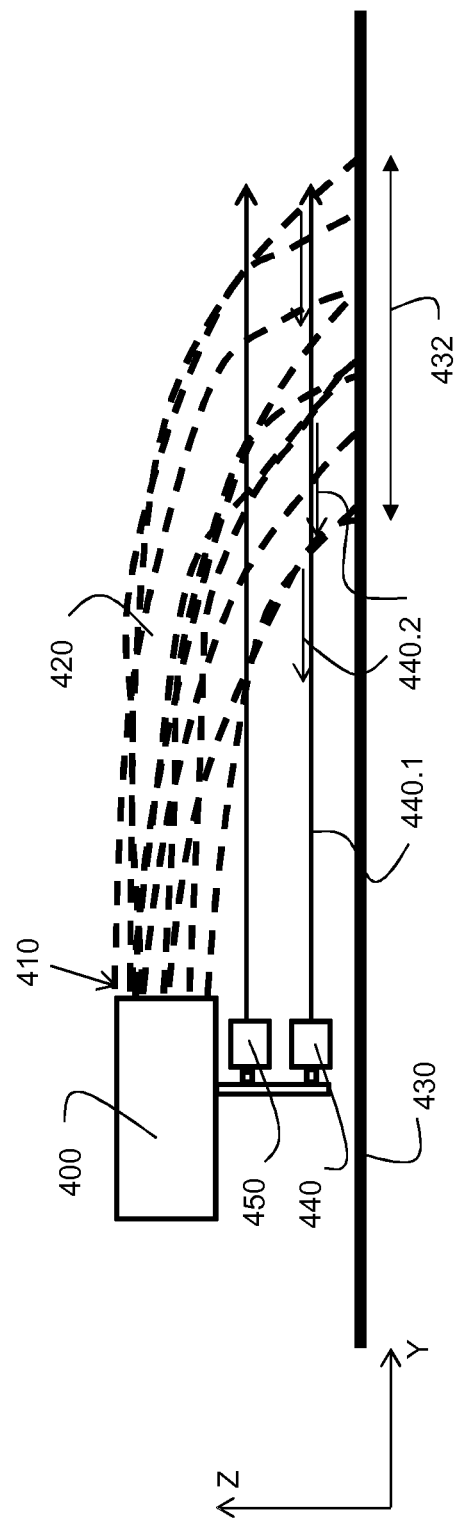

As indicated above, the one or more measurement waves as provided by the sensing system, are configured to intersect with the flow of crop residue. In particular, in accordance with the present invention, the one or more measurement waves provide in a two-dimensional measurement area which covers or exceed the spreading area of the flow of crop residue. FIG. 3(*a*) schematically illustrates the spreading area of a flow of crop residue that is emitted by a spreading system. FIG. 3(*a*) schematically shows a flow of crop residue 370 emitted by a spreading system 380. The individual particles of the flow of crop residue 370 each follow a certain trajectory and ultimately land on the soil, in an area referred to as the deposit area, indicated by the dotted line 390. Within the meaning of the present invention, the area that is covered or spanned by the flow of crop residue 370, when the flow is e.g. observed from above, is referred to as the spreading area.

By observing the flow of crop residue across a measurement area at the end of the trajectory of the crop residue, close to the crop stubble, a more accurate determination of the distribution of the crop residue is obtained. In particular, in arrangements whereby the flow of crop residue is only monitored at or near the outlet of the spreading system, the trajectory of the crop residue from the spreading system to the deposit area is subject to various factors. In particular, external factors such as wind velocity and wind strength have to be taken into account by the measurements, as are residue related parameters such as residue length or humidity. Hence, the present invention does not require a modelling step to reckon with these factors.

FIG. 3(*b*) schematically shows a cross-sectional view along the longitudinal axis of a possible sensor configuration, relative to a spreader assembly of a combine harvester.

The cross-sectional view schematically shows a spreader assembly 400 configured to output a flow of crop residue 410, whereby the flow of crop residue 410 follows a particular trajectory, indicated by the dotted lines 420, and ultimately arrives on a deposit area 432 on the soil 430. In the embodiment as shown, a first sensor 440 of a sensing system of a monitoring system according to the present invention is mounted underneath the spreading system 400 and is configured to emit one or more measurement waves 440.1 towards the flow of crop residue such that the measurement waves 440.1 intersect the flow of crop residue 410 close to the deposit area 432. In the embodiment as shown, the sensor 440 is configured to emit the measurement waves 440.1 in a substantially horizontal plane, i.e. substantially parallel to the soil 430. As shown, the measurement wave 440.1 protrudes the flow of crop residue resulting in the generation of different reflected measurement waves 440.2. In the embodiment as shown, the sensing system may further comprise a second sensor 450 that is mounted above the first sensor 440 and is configured to emit measurement waves 450.1 in a plane above the plane of the measurement waves of the first sensor.

Such an arrangement, whereby the flow of crop residue 410 is monitored in different planes may be advantageous as it may enable to more accurately forecast where the flow of crop residue will land on the soil.

As an alternative to mounting multiple sensors adjacent each other, in order to monitor the flow of crop residue in different planes, one may also apply a single sensor and rotate or translate the sensor, in order to sequentially scan the flow of crop residue in different planes.

By monitoring the flow of crop residue in multiple planes, one may monitor the flow of crop residue in a more accurate manner and thus forecast the trajectory of the crop residue more accurately. In such embodiment, one may e.g., apart from the distribution and the velocity of the crop residue, also determine an acceleration or deceleration of the crop residue and apply this characteristic to forecast where the crop residue will arrive on the soil.

Anyhow, where no such high accuracy is needed, the system already provides useful distribution data as provided by the first sensor 440.

Figure 4:
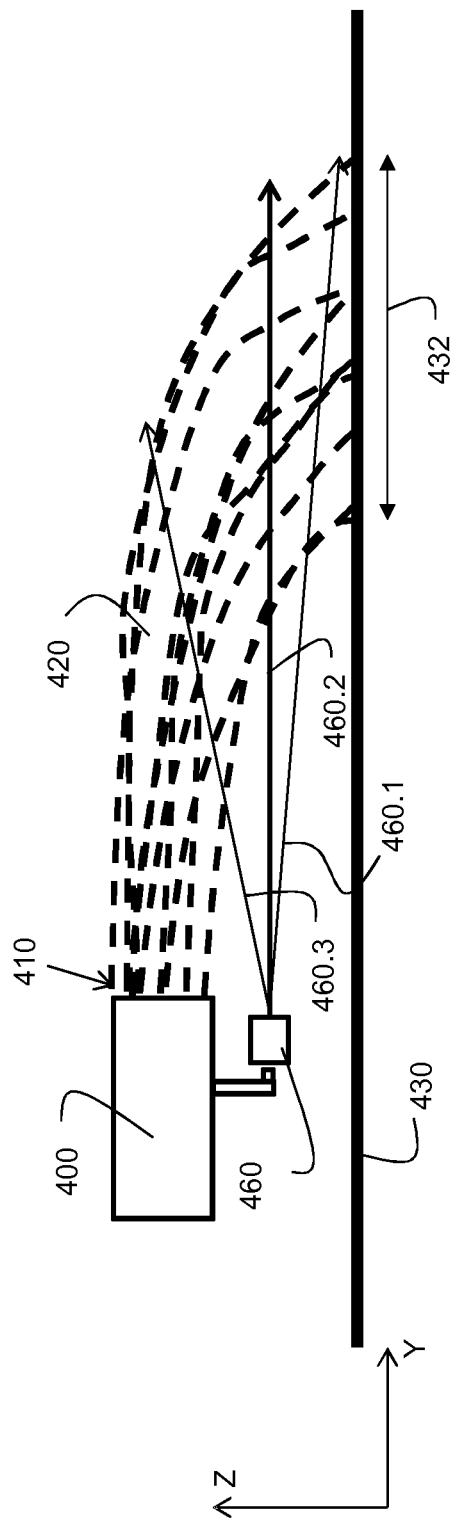
FIG. 4 schematically depicts a cross-sectional view of a spreader assembly as can be applied in a combine harvester according to the present invention and a second sensing system of a monitoring system according to the present invention.

FIG. 4 schematically shows such an arrangement, whereby a sensor 460 of a sensing system is configured to scan the flow of crop residue 410, 420 emitted by the spreading system 400, in different planes 460.1, 460.2, 460.3 intersecting with the flow. Such a scanning may e.g. be realized by rotating the sensor about an X-axis perpendicular to the YZ-plane. Alternatively, changing the direction of the measurement waves emitted may also be realized in an electronic manner, as explained in more detail below.

In an embodiment of the present invention, the sensing system comprises one or more radars. As an example, a CW (Continuous Wave) radar may be applied to emit measurement waves to the measurement area. Such a CW-radar enables to determine both the velocity and the direction of movement of the flow of crop residue that is discharged. Such a CW-radar provides in a comparatively high sensitivity, is robust and suitable to be applied in dusty environments such as occurring at the rear of a combine harvester. Typically, a measurement wave as emitted by a radar sensor may span 60 degrees or more. As an alternative to the use of a CW-radar, the use of an FMCW (Frequency Modulated Continuous Waves) radar may be worth mentioning. In addition to the assessment of the velocity and direction of the flow of crop residue, such an FMCW-radar also enables to determine a location of the flow of residue.

In an embodiment, a combination of a radar based monitoring system and an ultrasonic based monitoring system may be considered as well. In such a system, a CW-radar may e.g. be applied to primarily determine the velocity and direction of a flow of crop residue, whereas the ultrasonic sensor or sensors are applied to determine a position of the flow of crop residue.

Preferably the sensing system as applied in the present invention should have a sufficiently small angular resolution, i.e. rendering it possible to determine both the distance and angular position of the origin of a reflected measurement wave.

A sensing system having a particular angular resolution may be realized in various manners.

A first manner to realize a particular angular resolution is to apply an emitter that is configured to project or emit a measurement beam having a comparatively small beam width and sequentially changing the direction in which the measurement beam is emitted. By doing so, the measurement beam may cover a two-dimensional measurement area, such as the planes shown in FIGS. 3(*b*) and 4. The changing of the direction of the measurement beam of such an emitter may be realized in a mechanical manner, referred to as a mechanically steerable emitter or electronically, referred to as an electronically steerable emitter. Note that, in case of an electromagnetic sensing system, such as a radar, an emitter or receiver of such a system may also be referred as an antenna.

A second manner to realize a particular angular resolution is to apply an array of receivers and determine the angle of arrival of a reflected wave based on a phase difference observed by the receivers. In such an arrangement, the measurement wave may be emitted to the measurement area as a whole, rather than having to scan the area.

More details on such sensing systems are provided here below:

As an example of a mechanically steerable emitter, a radar with a parabolic antenna may be mentioned. Such an antenna enables to both receive and emit energy in a particular direction. By rotating the antenna, a particular area of interest may be scanned. In order to rotate the antenna, one or more actuators may be applied, e.g. electromagnetic, pneumatic or hydraulic actuators. With reference to FIG. 2, the sensors 300.1-300.3 may e.g. be such parabolic antennas, whereby the antennas are configured to rotate about a Z-axis, perpendicular to the XY-plane, e.g. about the scan angle α.

In a similar manner, the sensor 460 as shown in FIG. 4 may be a parabolic antenna that can be rotated about an X-axis, perpendicular to the YZ-plane, in order to scan the flow of crop residue in the different planes 460.1, 460.2, 460.3.

Alternative to mechanically rotating the sensor of the sensing system, it may be pointed out that the functionality of scanning across a particular area of interest with a desired angular resolution may also be performed electronically. Radars having such functionality may e.g. comprise an active electronically scanned array (AESA), also known as an electronically steerable antenna. Such an AESA is build from a large number of small antennas or individual elements, each element having an emitting module and a receiving module. By applying an appropriate delay or phase difference between the emitted waves of the different individual elements, the resulting wave can be directed, i.e. steered in a particular direction. Such a process is known as active digital beamforming. Active digital beamforming enables a rapid steering of a measurement beam, without the need for any mechanical movement or actuators.

In a similar manner, an array of ultrasonic transducers may be applied to emit an ultrasonic beam, as a measurement wave, in a desired direction.

A particular implementation of beamforming is known as FFT beamforming.

Figure 5:
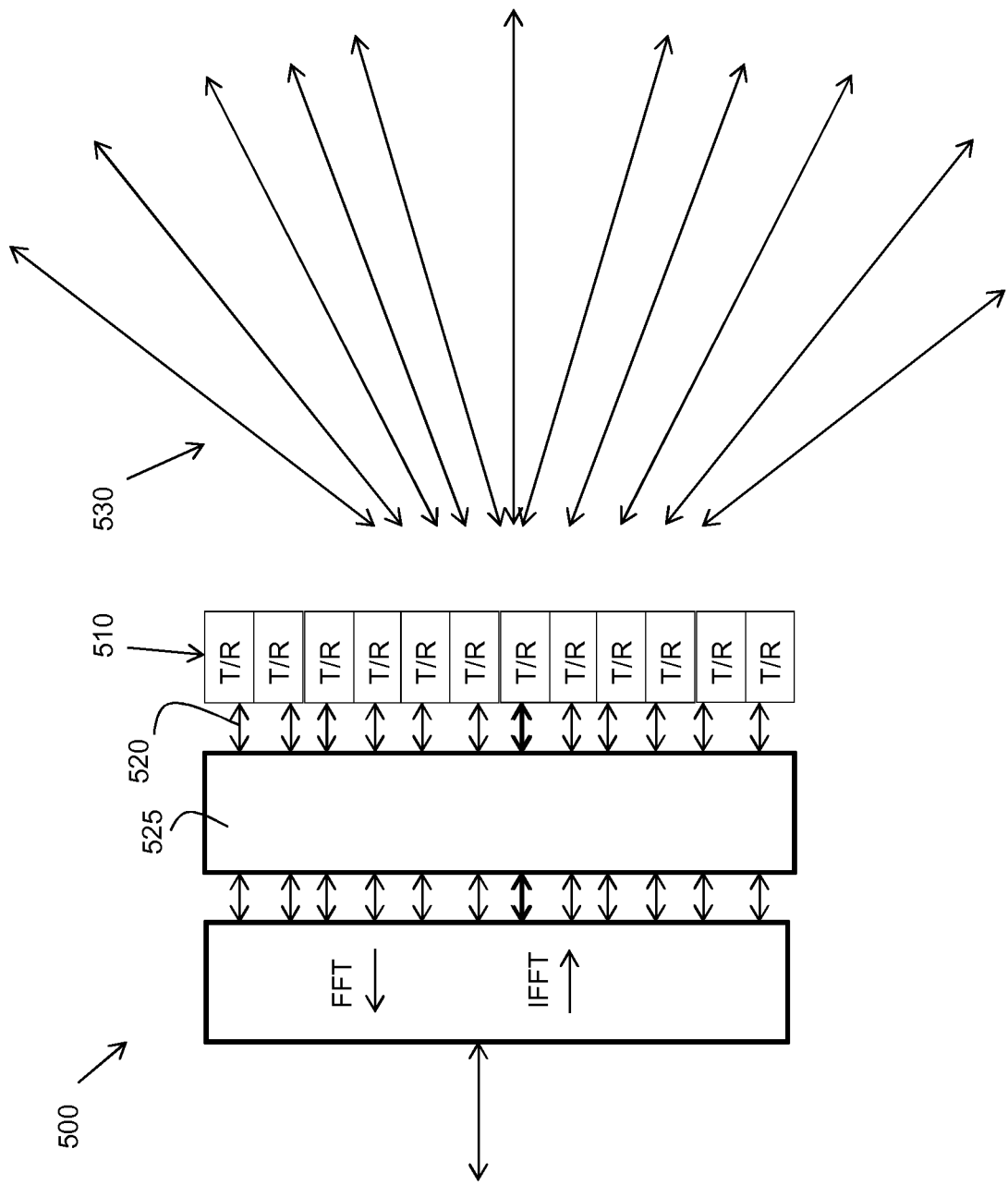
FIGS. 5(a) and (b) schematically depict embodiments of a radar as can be applied in a monitoring system according to the present invention.
Figure 5:
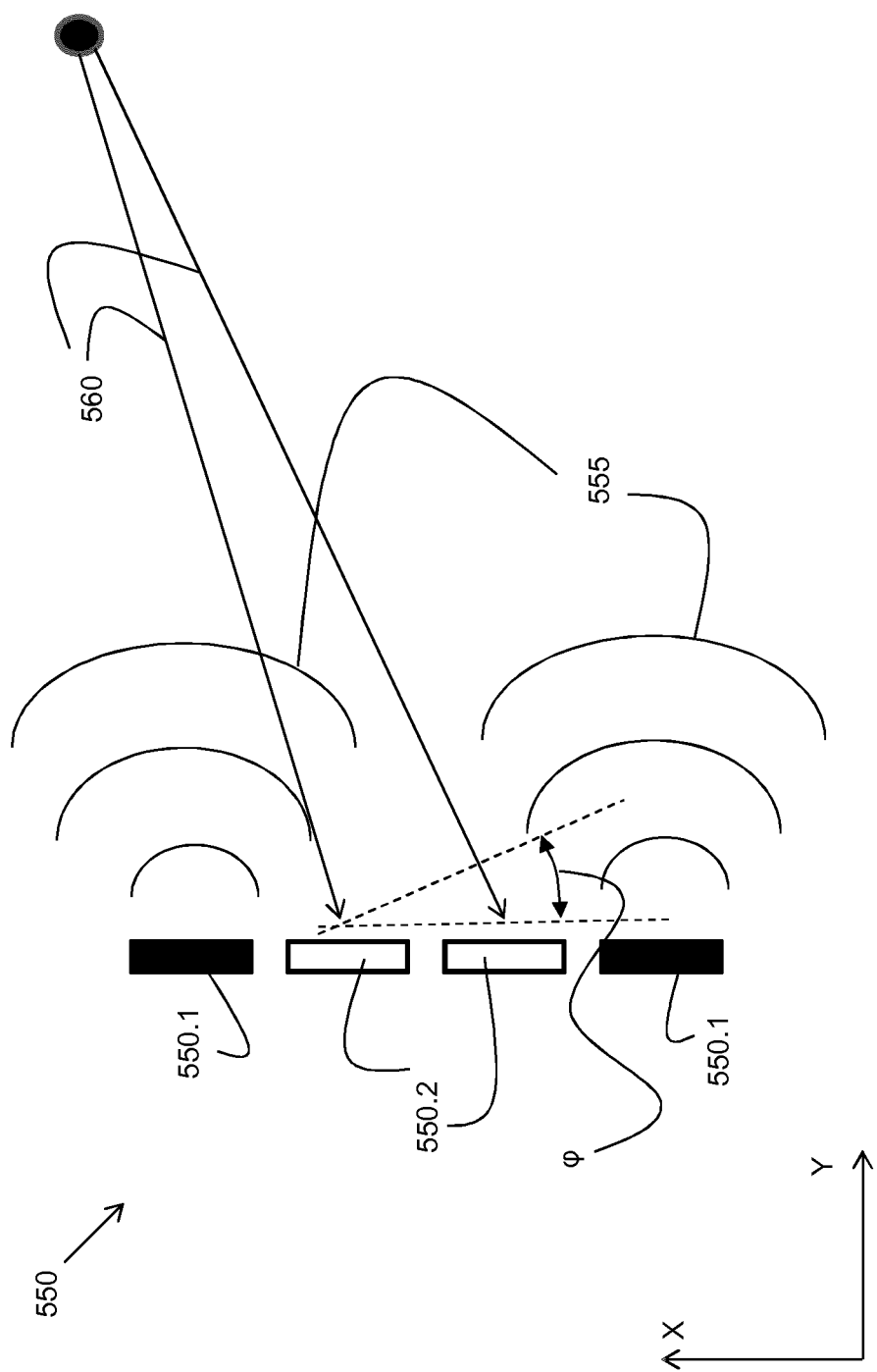

FIG. 5 schematically illustrates the principle of FFT beamforming in case of an antenna array.

In FIG. 5(a), an electronically steerable antenna 500 is schematically shown. The antenna 500 comprises an array of small antennas 510, each configured to transmit (T) and receive (R) electromagnetic waves. In the embodiment as shown, each of the small antennas is individually controlled, indicated by control signals 520 generated by a processor 525. By emitting, by the array of small antennas, electromagnetic waves that are delayed relative to each other, i.e. by introducing a phase difference between the emitted waves, a resulting electromagnetic wave may be emitted in a selected direction, e.g. a direction as indicated by the arrows 530. By sequentially varying the phase difference, the resulting electromagnetic wave may e.g. scan an area or segment defined by the scan angle α as shown. This is known as digital beamforming, enabling an electromagnetic beam to be emitted in a particular direction. Note that, by observing any delays or phase differences in the electromagnetic waves as received by the individual antennas of the array of antennas, the angle of arrival of a receiving wave may be determined, and this the orientation of the object that has cause the received (reflected) wave. Digital beamforming can also be used in another capacity. In some systems, it is desired to receive and transmit separate signals in different directions simultaneously. This can be accomplished by using an FFT algorithm. In general an FFT algorithm is used to separate a time domain signal into its different frequency components. In case of FFT beamforming however, an FFT algorithm is used to separate an incoming signal into its different spatial components or angle of arrival components. The input signals are sorted by the FFT algorithm into different components having different angles of arrival. Similarly, in the transmitting direction, a desired signal distribution may be inputted and converted to control signals 520 in order to generated the desired spatial distribution.

In FIG. 5(b) an antenna array 550 is shown which enables to determine an angle of arrival of a reflected wave. The antenna array 550 as schematically shown comprises a pair of transmitters 550.1 configured to transmit or emit a measurement beam 555 in a plane, e.g. the XY plane. The antenna array further comprises a pair of receivers 550.2 configured to receive a reflected wave, or response wave, 560, reflected off an object 565, e.g. a portion of crop residue. Due to the different location along the X-direction, the reflected waves as received by the different receivers 550.2 will have a phase difference, based on which the angular position of the object 565 may be determined. The phase difference between the reflected waves as received by the receivers 550.2 is caused by the difference in distance between the object 565 and the receivers 550.2, this difference being proportional to $\sin(\varphi)$, the angle $\varphi$ being representative of the position of the object relative to the Y-direction.

Note that the same measurement principle may be applied in an ultrasonic sensing system. In such a system, an angle of arrival of a reflected ultrasonic wave may be determined based on an observed phase difference by the different ultrasonic receivers of the ultrasonic sensing system.

With respect to the measurement principles as described, it is worth mentioning that these principles may be expanded to enable measurements in a three-dimensional volume.

As a first example, a mechanically steerable emitter may e.g. be configured to rotate about an X-axis, thus enabling the emitter to scan over multiple planes 460.1, 460.2, 460.3 as e.g. indicated in FIG. 4. By doing so, in addition to rotating the emitter about the Z-axis, a three-dimensional measurement volume may be scanned.

As a second example, the beam steering principle as applied in an ASEA or electronically steerable antenna may be expanded by applying a two-dimensional pattern of antennas. By applying an appropriate delay or phase difference between the emitted electromagnetic waves of the different individual antennas, the resulting wave can be directed, i.e. steered in a particular direction. In particular, when applying a two-dimensional array of antennas, extending in the X-direction and the Z-direction, a measurement beam may e.g. be steered both in the XY-plane and the YZ-plane. Note that a similar expansion from a two-dimensional measurement area to a three-dimensional measurement volume may also be realized by means of a two-dimensional array or ultrasonic transducers. By applying an appropriate delay or phase difference between the emitted ultrasonic waves of the different transducers, the resulting wave can be directed, i.e. steered in a particular direction.

As a third example, by expanding the receiver array 550.2 as schematically shown in FIG. 5(b) in the Z-direction, thus obtaining a two-dimensional receiver array, an angle of arrival of a reflected wave may also be determined in the YZ-plane.

By means of such implementations in a monitoring system according to the present invention, a density and velocity distribution of a flow of crop residue may be determined in a three-dimensional measurement volume.

The above described radar systems and ultrasonic systems may advantageously be applied as sensing system in a monitoring system according to the present invention.

As such, the sensing system as applied in the monitoring system according to the present invention, may thus be configured to emit one or more measurement waves to cover a two-dimensional measurement area, multiple two-dimensional measurement areas, a three-dimensional measurement volume or a combination thereof. The sensing system of the monitoring system is further configured to receive a plurality of reflected waves from the measurement area, areas or volume and provide a response signal to the processing unit of the monitoring system, the response signal representative of the plurality of response waves reflected from the measurement area, areas or volume.

Upon receipt, the response signal, representative of the plurality of response waves reflected from the measurement area, areas or volume, is processed by the processing unit of the monitoring system.

In accordance with the present invention, the processing unit, e.g. the processing unit 310 as shown in FIG. 2, comprising an input terminal that is configured to receive a response signal of the sensing system, the response signal representative of the plurality of response waves that were reflected from the measurement area. In accordance with an embodiment of the present invention, the processing unit is configured to process the response signal and determine, based on the response signal, a density and velocity distribution of the crop residue across the measurement area or volume.

In an embodiment, such a density and velocity distribution may be made available for reviewing by an operator of the combine harvester. The density and velocity distribution may e.g. be displayed on a display in the cabin of the combine harvester. In such an embodiment, the operator may e.g. use the density and velocity distribution as displayed as a visual feedback of the manner in which the crop residue is spread across the spreading area. This visual feedback may e.g. be used to adjust an operating parameter of the spreading system. In case the density and velocity distribution as displayed would correspond to a desired density and velocity distribution, the operator may e.g., in an embodiment of the present invention, provide an input signal to the processing unit of the monitoring system, the input signal being indicative that the density and velocity distribution substantially corresponds to a desired density and velocity distribution.

In such embodiment, the processing unit may be configured to, upon receipt of such an input signal:
  receive a subsequent response signal of the sensing system, the subsequent response signal representative of a plurality of subsequent response waves reflected from the measurement area;
  determine, based on the response signal, a subsequent density and velocity distribution of the crop residue across the two-dimensional measurement area, and
  determine, based on a comparison of the subsequent density and velocity distribution and the desired density and velocity distribution, a control signal for the spreading system, in order to substantially maintain the desired density and velocity distribution.

In order to compare a desired density and velocity distribution with a subsequent determined density and velocity distribution, the processing unit of the monitoring system may e.g. make use of pattern recognition software or the like. Using such software, the processing unit may determine whether or not an adjustment of the spreading system is required. Such an assessment may e.g. be based on assessing in which part or parts of the measurement area the density and velocity distribution corresponds well or sufficiently to the desired density and velocity distributions and in which part or parts it does not. Based on such an assessment, the processing unit may determine a control signal to control an operational parameter of the spreading system of the harvester to which the monitoring system is applied.

In such an embodiment, the processing unit may thus be configured to autonomously control the spreading system, once a desired distribution of the flow of crop residue is reached, thereby controlling the spreading system in such manner that the desired distribution is substantially maintained.

In an embodiment, the processing unit is further configured to determine:
  a trajectory of the crop residue towards a deposit area on the soil based on the density and velocity distribution and
  a distribution of the crop residue over the deposit area.

Figure 6:
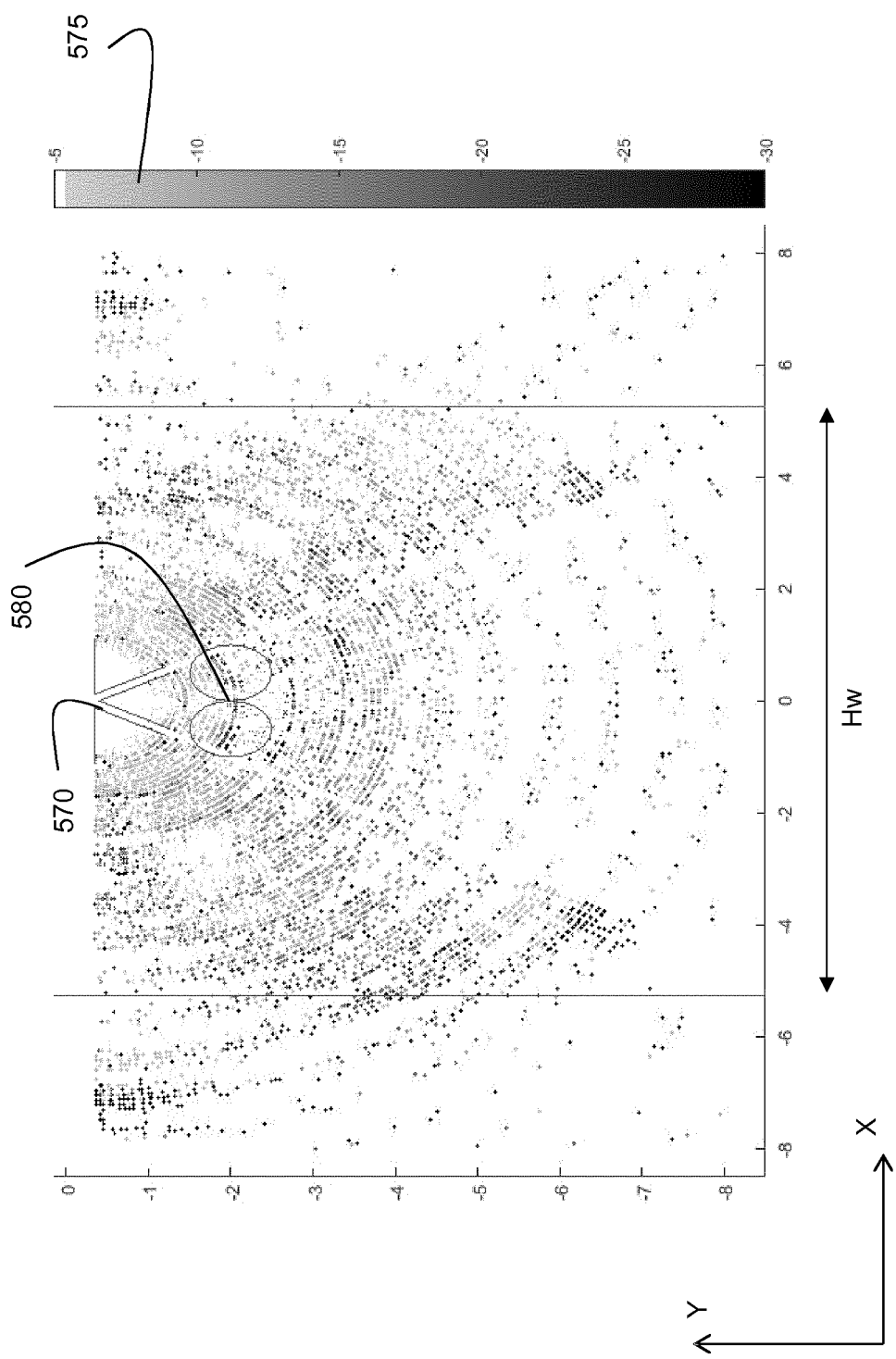
FIG. 6 schematically depicts a density and velocity distribution of crop residue as can be determined by a monitoring system according to the present invention.

FIG. 6 schematically shows a density and velocity distribution of a flow of crop residue as determined using a response signal obtained from a radar. In particular, the density and velocity distribution as shown is determined using three radars, each spanning an angle of substantially 60 degrees, as indicated by the angles 570. The figure shows the distribution of crop residue in a horizontal XY-plane, spanning a width that is larger than the width of a header Hw of a combine harvester, together with the associated velocity of the detected residue, the velocity being indicated by the grey-scale 575 indicating the velocity in km/hr. FIG. 6 further schematically shows the contours 580 of the spreading system as applied. In accordance with the present invention, this density and velocity distribution is used to calculate where the detected crop residue will land, along the width of the header Hw. In particular, in an embodiment of the present invention, the processing unit is further configured to determine:
  a trajectory of the crop residue towards a deposit area on the soil based on the density and velocity distribution and
  a distribution of the crop residue over the deposit area.

This is done by calculating the trajectory of the detected crop residue. In this respect, it can be pointed out that, since the orientation of the measurement waves relative to the soil is known in advance, the measurement waves e.g. being transmitted in a horizontal plane located at a predetermined height above the soil, one may determine, based on the position and velocity of a particle of crop residue that is detected at the predetermined height, the trajectory of the particle and thus where this particle will land. In order to do so, the processing unit of the monitoring system according to the present invention may use a ballistic model. Such a ballistic model to determine the trajectory of the crop residue may make use of one or more of the following parameters:
  average crop residue length,
  humidity of the crop residue and/or the air,
  wind velocity,
  combine velocity,
  air resistance,
  flow rate of the spreading system,
  etc.

In an embodiment, the model parameters may be determined based on measurement data obtained from one or more sensors on the combine harvester. Alternatively, or in addition, appropriate values for the parameters may also be provided by an operator, e.g. via a user interface connected to the processing unit.

Once the trajectory of the crop residue is know, the distribution of the crop residue across the deposit area may be calculated.

As such, based on the position and velocity distribution as measured using the sensing system, the processing unit may determine a distribution of the crop residue on the soil.

Figure 7:
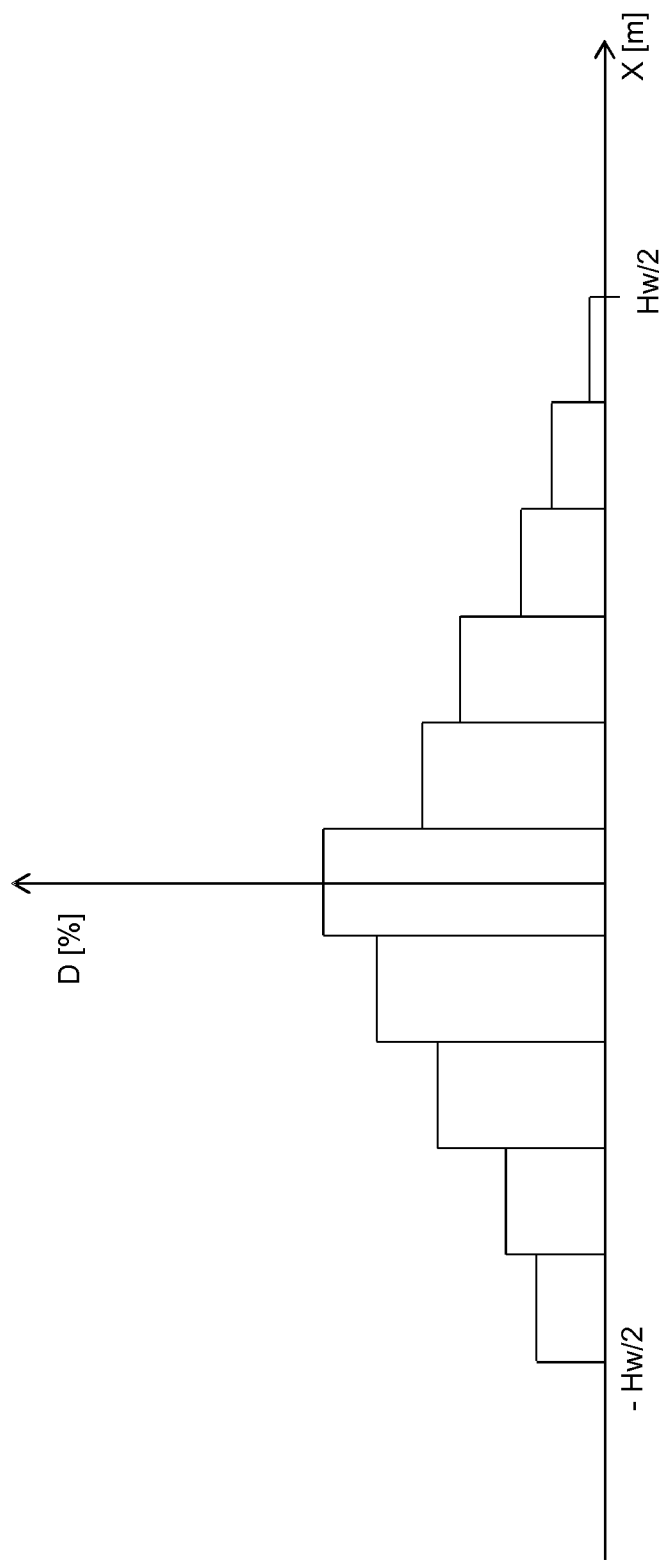
FIG. 7 schematically depicts a crop residue distribution along a header width as can be determined using a monitoring system according to the present invention.

Based on this distribution, the distribution of the crop residue along the header width may be determined. Such a distribution may be determined as a continuous distribution or a discrete distribution. In the latter case, the deposit area, i.e. the area where the crop residue is predicted to land, is considered subdivided into non-overlapping sub-areas arranged adjacent each other along the header width. In an embodiment, the amount of crop residue may be determined for each of the sub-areas. FIG. 7 schematically shows a possible discrete distribution D [%] along a header width Hw, whereby the distribution area along the header width is considered to be subdivided in 10 sub-areas. As can be seen, the calculated or forecasted distribution along the header width as shown in FIG. 7 is not uniform but rather shows a maximum near the center of the header width, i.e. on the longitudinal axis of the harvester.

In accordance with the present invention, the processing unit of the monitoring system further comprises an output terminal configured to output a distribution signal representative of the distribution of the crop residue over the deposit area. As an example of such distribution signal, the distribution over the 10 segments as shown in FIG. 7 may e.g. be outputted. Such a distribution may e.g. be provided to a display in a cabin of the combine harvester, such that the operator of the harvester obtains visual feedback on the distribution.

In an embodiment of the present invention, the forecasted distribution as determined by the processing unit may be compared to a desired distribution. A deviation between the actual (forecasted) distribution and the desired distribution may e.g. be quantified by determining a variance of the distribution. Such a variance may be considered a quality of the distribution. Alternatively, the difference between the maximum and minimum distribution may also be considered an indication of the quality of the distribution.

Based on such a distribution quality indicator, i.e. a qualification or quantification of the distribution quality, the processing unit may be configured to, in an embodiment of the present invention, generate a control signal for controlling an operation of a spreader assembly. In general, a spreading assembly or spreader of a combine harvester may include one or more vanes or blades who's position can be controlled, thereby affecting the manner in which the crop residue is outputted by the spreader and thus affecting the distribution of the crop residue onto the soil or field.

Figure 8:
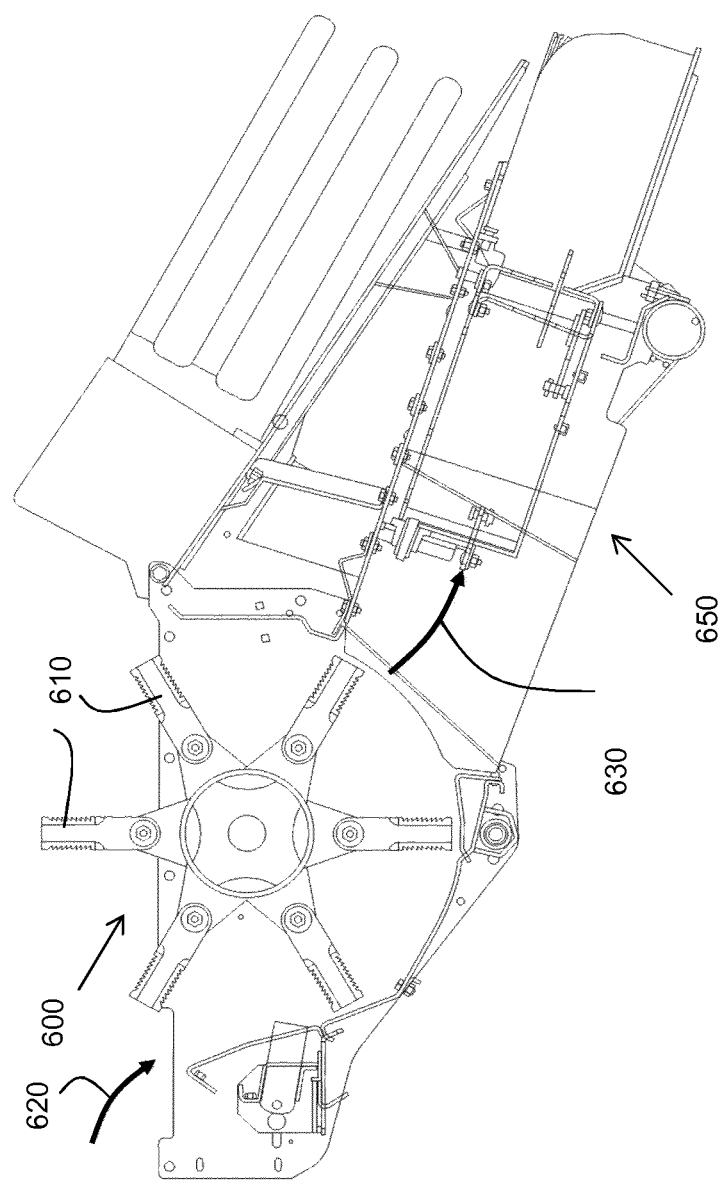
FIG. 8 schematically depicts a cross-sectional view of part of a threshing and chopping system and a spreader assembly as can be applied in a combine harvester according to the present invention.

FIG. 8 schematically depicts a cross-sectional view of part of a chopping system and a spreader assembly as can be applied in a combine harvester according to the present invention. FIG. 4 schematically depicts a chopping tool 600 comprising a plurality of blades 610, the chopping tool 600 being configured to receive a flow of straw 620, chop the straw to obtain crop residue and provide the flow of crop residue, indicated by the arrow 630, to a spreader assembly 650, the spreader assembly 650 being configured to spread the crop residue onto the field, as described above.

FIG. 9 schematically shows various components of the spreader assembly 650 as indicated in FIG. 8. The spreader assembly 650 as shown comprises a pair of rotatable elements 700 (comparable to the rotatable elements 220 as shown in FIG. 2) that are configured to receive a flow of crop residue, and a pair of deflectors 710 (comparable to the deflectors 224 as shown in FIG. 2) for distributing the flow of crop residue over a deposit area, in particular a deposit area spanning a width of a header of the combine harvester to which the spreader assembly is mounted.

In order to control the actual distribution of the crop residue, a position of the deflectors 710 may be adjustable. In an embodiment, the deflectors may be configured to rotate about a vertical axis, thereby adjusting the distribution of the crop residue on either the left hand side or the right hand side of the spreader assembly.

In an embodiment, the deflector 710 may be configured to displace along a vertical axis to adjust the distribution of the crop residue.

In an embodiment, a rotational speed of the rotatable elements 700 can be made adjustable. In such embodiment, the rotatable elements 700 may e.g. be configured to rotate at the same variable speed, or each rotatable element may be controlled individually.

By means of the aforementioned ways to adjust the operation of the spreader assembly 650, the distribution of the crop residue can be controlled, in order to take account of different or varying harvesting conditions. The distribution of the crop residue, in particular the uniformity over the header width thereof, may be adversely affected by the harvesting conditions, e.g. the conditions of the field that is harvested, or the weather conditions.

In case the field that is harvested is tilted, this will affect how the crop residue is spread. Similarly, in case of wind or rain, the distribution of the crop residue may be affected.

By means of the monitoring system according to the present invention, in particular by means of the processing of a signal representative of a plurality of response waves by the processing unit of the monitoring system, a distribution signal is made available, the distribution signal being representative of the distribution of the crop residue over the deposit area. The distribution signal may subsequently be used to control an operational parameter of the combine harvester, in particular of the spreader assembly of the combine harvester.

As an example, in case the distribution signal indicates that the distribution of the crop residue is not as desired along the deposit area, a position of one or both of the deflectors 710 of the spreader assembly 650 as shown in FIG. 9 can be adjusted, in order to adjust the distribution of the crop residue.

In an embodiment, the control of the spreader assembly is performed by an operator of the harvester. In such embodiment, the distribution signal as provided by the processing unit of the monitoring system may e.g. be provided to a display unit of the combine.

In an embodiment, the control of the spreader assembly can be automated. In such embodiment, the processing unit may be configured to determine, based on the distribution of the crop residue as determined, an appropriate control signal for controlling an operation of the spreader assembly.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or control unit may fulfil the functions of several items recited in the claims.

The invention claimed is:

1. A monitoring system for a combine harvester having a header for harvesting a crop and a residue spreading system for spreading a crop residue, the monitoring system comprising:

a sensing system configured to:
  provide one or more measurement waves, intersecting a flow of crop residue discharged by the spreading system, the one or more measurement waves determining a two-dimensional measurement area; and
  receive a plurality of response waves reflected from the measurement area; and a processing unit comprising an input terminal configured to receive a response signal of the sensing system, the response signal representative of the plurality of response waves reflected from the measurement area, the processing unit configured to determine, based on the response signal, a density and velocity distribution of the flow of crop residue across the two-dimensional measurement area, wherein the measurement area is at an end of a trajectory of the crop residue from the spreading system to a deposit area, at least partly before the crop residue arrives on the deposit area, wherein the sensing system comprises a sensor mounted underneath the residue spreading system.

2. The monitoring system according to claim 1, wherein the sensing system comprises two sensors, respectively sensing a left hand and right hand portion of the flow of crop residue.

3. The monitoring system according to claim 1, wherein the processing unit is further configured to:
generate a signal indicative of a density and velocity distribution substantially corresponding to a desired density and velocity distribution;
receive a subsequent response signal of the sensing system, the subsequent response signal representative of a plurality of subsequent response waves reflected from the measurement area;
determine, based on the subsequent response signal, a subsequent density and velocity distribution of the crop residue across the two-dimensional measurement area; and
determine, based on a comparison of the subsequent density and velocity distribution and the desired density and velocity distribution, a control signal for the spreading system, in order to substantially maintain the desired density and velocity distribution.

4. The monitoring system according to claim 1, wherein the processing unit is further configured to determine a distribution of the crop residue over the deposit area, the processing unit further comprising an output terminal configured to output a distribution signal representative of the distribution of the crop residue over the deposit area.

5. The monitoring system according to claim 1, wherein the two-dimensional measurement area has a substantially horizontal orientation.

6. The monitoring system according to claim 1, wherein the one or more measurement waves as provided by the sensing system determine a three-dimensional measurement volume intersecting the flow of crop residue discharged by the spreading system.

7. The monitoring system according to claim 1, wherein the sensing system is further configured to determine multiple two-dimensional measurement areas, each intersecting the flow of crop residue discharged by the spreading system at a same or a different height above the deposit area.

8. The monitoring system according to claim 1, wherein the sensing system is further configured to scan the measurement area across a scan angle substantially spanning or exceeding the deposit area.

9. The monitoring system according to claim 8, wherein the sensing system comprises a plurality of sensors, each scanning a portion of the scan angle.

10. The monitoring system according to claim 1, wherein the sensing system comprises a radar system or an ultrasonic system.

11. The monitoring system according to claim 1, wherein the processing unit is configured to determine the density and velocity distribution of the crop residue by determining an amount of crop residue in a plurality of sub-areas of the deposit area.

12. The monitoring system according to claim 1, wherein the processing unit is further configured to determine a distribution quality indicator representing a variation of the distribution of the crop residue along a width of the header.

13. The monitoring system of claim 1, wherein the one or more measurement waves are emitted in a plane intersecting the flow of crop residue at a predetermined distance above the soil to determine the two-dimensional measurement area.

14. The monitoring system of claim 1, wherein the residue spreading system is a crop spreader having rotatable elements for distributing the crop residue onto the deposit area, and the sensor is spaced apart from and disposed at an elevation beneath the crop spreader for sensing the crop residue expelled from the crop spreader prior to the crop residue reaching the deposit area.

15. A combine harvester comprising:
a header for harvesting a crop of a field;
a threshing and chopping system for separating a crop residue from the harvested crop;
a spreading system for spreading the crop residue onto the field; and
a monitoring system comprising:
a sensing system configured to:
provide one or more measurement waves, intersecting a flow of crop residue discharged by the spreading system, the one or more measurement waves determining a two-dimensional measurement area; and
receive a plurality of response waves reflected from the measurement area;
a processing unit comprising an input terminal configured to receive a response signal of the sensing system, the response signal representative of the plurality of response waves reflected from the measurement area, the processing unit configured to determine, based on the response signal, a density and velocity distribution of the flow of crop residue across the two-dimensional measurement area;
wherein the measurement area is at an end of a trajectory of the crop residue from the spreading system to a deposit area, at least partly before the crop residue arrives on the deposit area,
wherein the sensing system comprises a sensor mounted underneath the residue spreading system.

16. The combine harvester according to claim 15, wherein the processing unit of the monitoring system is further configured to generate a control signal for controlling the spreading system, based on the density and velocity distribution of the crop residue over the deposit area.

17. The combine harvester of claim 15, wherein the one or more measurement waves are emitted in a plane intersecting the flow of crop residue at a predetermined distance above the soil to determine the two-dimensional measurement area.

18. The combine harvester of claim 15, wherein the spreading system is a crop spreader having rotatable elements for distributing the crop residue onto the field, and the sensor is spaced apart from and disposed at an elevation beneath the crop spreader for sensing the crop expelled from the crop spreader prior to the crop residue reaching the field.

* * * * *